United States Patent

[11] 3,582,169

[72] Inventor John B. Koenig
Lansing, Ill.
[21] Appl. No. 826,502
[22] Filed May 21, 1969
[45] Patented June 1, 1971
[73] Assignee Dynanamics, Inc.
Lansing, Ill.
Continuation-in-part of application Ser. No. 702,449, Feb. 1, 1968.

[54] LOCKABLE STORAGE UNIT FOR MAGNETIC TAPES, DISCS AND THE LIKE
20 Claims, 17 Drawing Figs.

[52] U.S. Cl. .......... 312/20
[51] Int. Cl. .......... A47b 81/00
[50] Field of Search .......... 312/20; 352/34, 36, 104, 242

[56] References Cited

UNITED STATES PATENTS

| | | | |
|---|---|---|---|
| 3,298,530 | 1/1967 | Clouthier .......... | 312/20 |
| 3,407,938 | 10/1968 | Walter et al. .......... | 312/20 |
| 2,617,699 | 11/1952 | Sullivan .......... | 312/20 |
| 3,051,537 | 8/1962 | Diehl et al. .......... | 312/20 |
| 3,316,039 | 4/1967 | Drobny .......... | 312/20 |

*Primary Examiner*—Patrick D. Lawson
*Attorney*—Olson, Trexler, Wolters & Bushnell

ABSTRACT: Locking apparatus for information storage units such as magnetic tape reels having a central opening therein. One embodiment of the device, for a tape reel, includes a portion for traversing said opening and a lock unit extending into the central opening of the reel to prevent the mounting thereof on a recording machine. Another embodiment is similar to the first except that it includes a casing which also prevents access to the tape itself.

Inventor
John B. Koenig
By: Olson, Trexler, Wolters & Bushnell attys

Inventor
John B. Koenig
By: Olson, Trexler, Wolters & Bushnell Att'ys.

Inventor
John B. Koening
By: Olson, Trexler, Wolters & Bushnell
Attys.

LOCKABLE STORAGE UNIT FOR MAGNETIC TAPES, DISCS AND THE LIKE

BACKGROUND OF THE INVENTION

This is a continuation-in-part of my copending application Ser. No. 702,449, filed Feb. 1, 1968.

This invention relates to locking devices and more particularly to locking devices for use with tape, recording discs or the like storage units.

In the computer field, magnetic discs or tape reels are frequently employed for the storage of information of all sorts. When not in use, the reels or discs are conventionally stored in cabinets, storerooms, or the like. Very often, however, the information recorded on these elements is of a confidential nature and must be accessible only to those having the proper security clearance.

Locking these confidential discs or tape reels in storerooms or cabinets prevents, to some extent, unauthorized access thereto, but once the cabinet or storeroom has been opened, all the elements therein are exposed and made accessible.

SUMMARY OF THE INVENTION

Accordingly, it is a primary object of this invention to provide new and improved apparatus for preventing access to information storage units, such as reels, discs or the like.

It is a further object of this invention to provide a locking device which may be used in conjunction with an individual tape reel or recording disc, to prevent access thereto.

It is still another object of this invention to provide a locking device of the above-mentioned type which is of a compact size and does not interfere with the storage of the tape reels or recording discs.

DESCRIPTION OF THE DRAWINGS

A better understanding of the present invention and its organization and construction may be had by referring to the description below in conjunction with the accompanying drawings, wherein.

DETAILED DESCRIPTION

Figure 1:
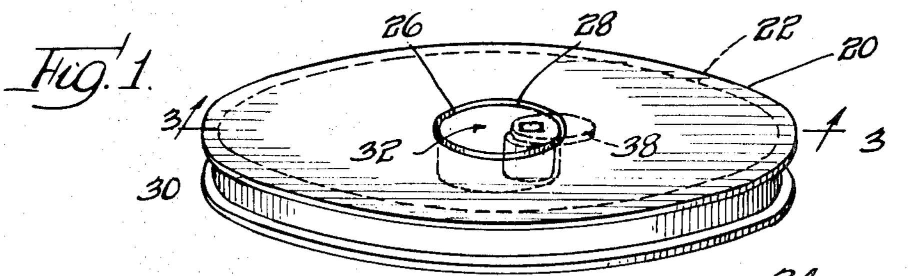
FIG. 1 is a perspective view of a tape reel and one embodiment of a locking device according to the invention secured thereto.

Referring now to the drawings more in detail, FIG. 1 thereof illustrates a conventional tape reel 20 comprising a pair of circular end plates 22 and 24 connected at the centers by a cylindrically shaped hub portion 26 having a central aperture 28 therethrough. Magnetic tape 30 of a width equal to the distance between the circular plates 22 and 24 is wound about the central hub portion 26 and between the circular plates 22 and 24 of the reel. Access to information stored on the magnetic tape 30 wound about the reel 20 is obtained by mounting the reel 20 at aperture 28 thereof onto a machine of a well-known type which is able to reveal through audio or visual means, the information stored on the tape.

A first embodiment 32 of a locking device according to the invention is shown in FIG. 1 secured to reel 20 in a manner such that central aperture 28 thereof is locked, thereby preventing reel 20 from being mounted on a machine of the above-described type.

Figures 2, 3, 4, 5, 6:
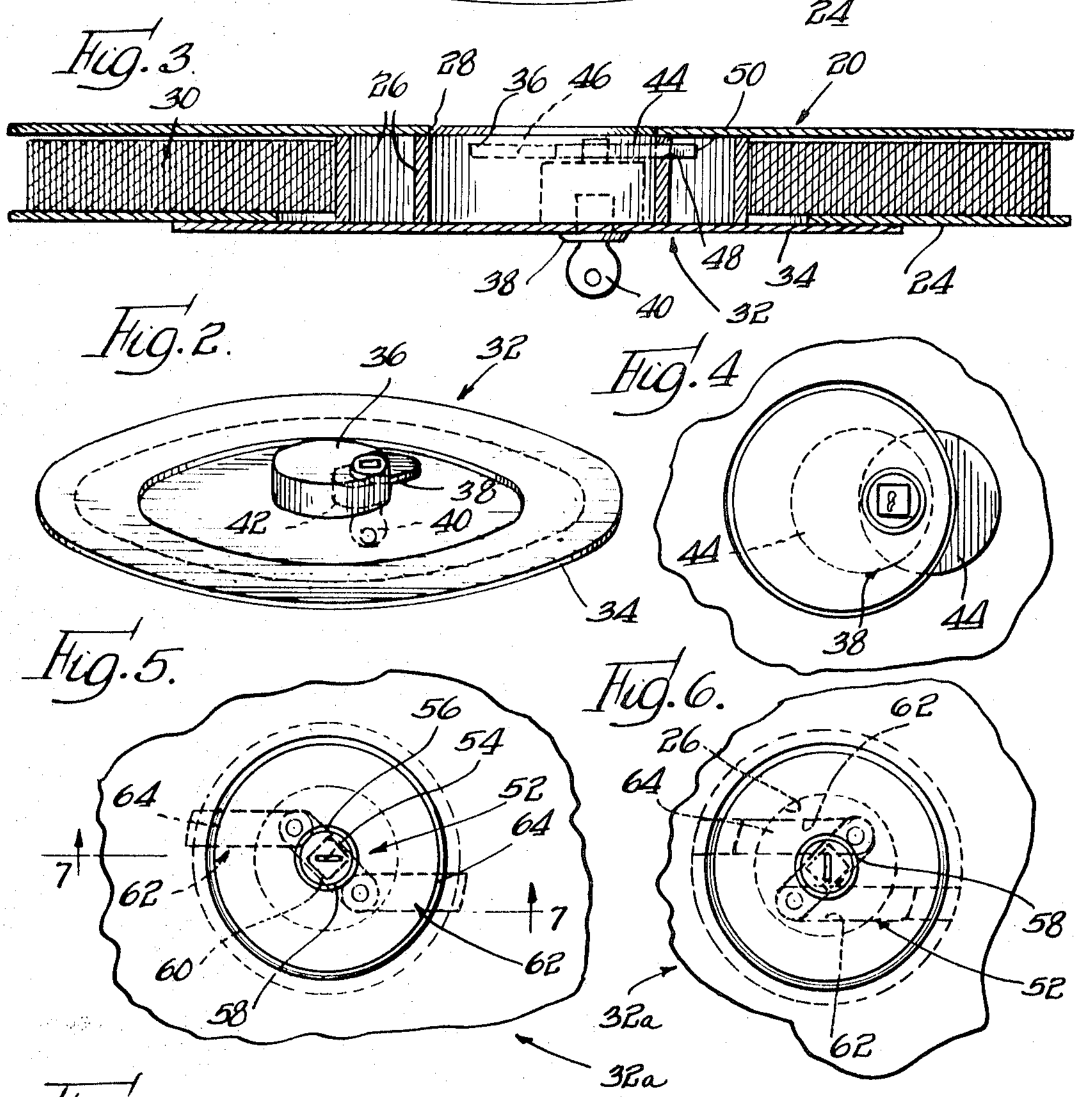
FIG. 2 is a perspective view of the locking device of FIG. 1, shown separated from a tape reel.
FIG. 3 is an enlarged cross-sectional view of the tape reel and locking device of FIG. 1, taken along the line 3–3 thereof.
FIG. 4 is an enlarged, sectioned, plan view of the lock mechanism of the locking device of FIG. 1 shown in a locked position.
FIG. 5 is a sectioned plan view of an alternative lock mechanism for the locking device of FIG. 1 shown in a locked position.
FIG. 6 is a sectioned plan view of the lock mechanism of FIG. 5 shown in an unlocked position.

Looking now to FIG. 2 of the drawings, the embodiment 32 of the locking device according to the invention can be clearly seen. Embodiment 32 of the device comprises a circular base portion 34 having mounted at the center thereof a plug portion 36 which extends outwardly from the base portion 34 a distance approximately equal to the width between end plates 22 and 24 of the tape reel 20. The diameter of plug portion 36 is substantially equal to the diameter of the central aperture 28 of the reel 20, so that the plug may be inserted thereinto. Included in the plug portion 36 of the locking device embodiment 32 is a locking mechanism 38, which as shown here is operable by means of a key such as 40 shown inserted into the tumbler 42 thereof.

To understand more clearly the operation of the embodiment 32 of the locking device of FIG. 2, reference is made to FIG. 3 of the drawings where locking device embodiment 32 is shown with its central plug portion 36 extending into central opening or aperture 28 of reel 20. The circular base portion 34 of the locking device embodiment 32 is larger in diameter than the central opening 28 of the reel so that the base portion is not able to pass through the central aperture 28, but instead fits flush against the end plate 24 of reel 20. As can be seen in FIG. 3, the locking mechanism 38 mounted in plug portion 36 of the locking device includes a circular plate portion 44 pivotally mounted within the plug portion 36, but off center with respect thereto. A slot 46 is provided within plug portion 36 to allow the circular plate 44 to be rotated by means of key 40 so that the plate 44 can be entirely placed within plug portion 36. The last-mentioned positioning of plate portion 44 comprises the unlocked condition of the locking device embodiment 32 and the position in which the plug portion is inserted into the central opening 28 of reel 20. After the plug portion 36 has been inserted into the central opening 28, the key 40 is turned so that the plate 44 of the locking mechanism is pivoted to a point, as shown in FIG. 3 of the drawings, with one side 50 thereof extending outwardly from the plug portion 36 and being received by a slotted aperture 48 formed in the hub portion 26 of the reel. This last-mentioned position is the locked position of the locking mechanism. Once positioned as shown in FIG. 3 with the key 40 removed from the locking mechanism 38, the reel 20 is unable to be mounted on a playback machine so that access to the information on magnetic tape is for the most part prevented.

FIG. 4 of the drawings illustrates the locking mechanism 38 with plate 44 shown in its locked and unlocked positions; the locked position shown in solid lines while the unlocked position is shown in dotted lines. As will be noted in FIG. 4, when the locking mechanism 38 is in its unlocked position, the plate 44 is coincident with and located entirely within plug portion 36, but upon turning the key 40 to lock the locking mechanism 38 the plate portion 44 is extended outwardly by a pivotal or rotational motion and extends into the aperture 48 in the hub portion 26 of reel 20 thereby to lock the device 32 within the central opening 28 of the reel.

Figure 7:
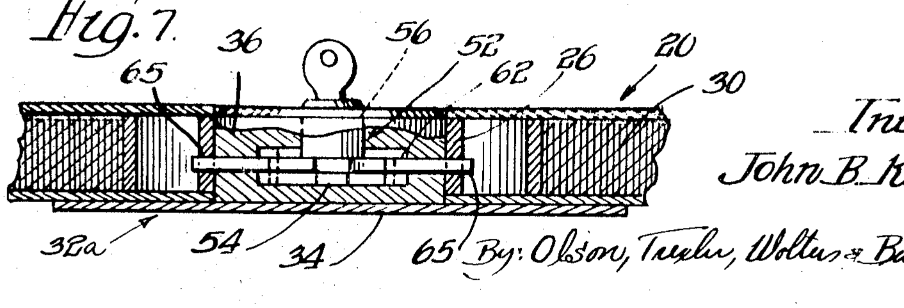
FIG. 7 is a cross-sectional view of the lock mechanism of FIG. 5 taken along the line 7–7 thereof.

Referring now to FIGS. 5—7, there is shown therein a modified embodiment 32*a* of the locking device 32 of FIGS. 1-—4. The modified embodiment 32*a* is similar to the embodiment 32 in that it comprises a circular plate portion 34 with a plug portion 36 extending from the center thereof. The modified embodiment 32*a*, however, includes a modified locking mechanism 52. As shown in FIGS. 5 and 6, the locking mechanism 52 includes a central shank portion 54 connected to a conventional lock tumbler 56, and a bar portion 58 which is connected at its center 60 to shank 54, here shown as being square shaped. The bar portion 58 is free to rotate within plug 36 in an aperture or slot 62 formed therein. An arm 62 is pivotally mounted at each end of the rotatable bar portion 58 so that, upon turning of the key 40, the shank 54 is rotated to in turn rotate bar 58 and to move the arms outwardly or inwardly accordingly. The free ends 64 of the arms, as shown in FIG. 7, can be inserted into aligned apertures 65 in the hub portion of the reel 20, so that the locking device is secured to the reel and thus access to information thereon is prevented.

FIGS. 5 and 6 illustrate the various elements of the locking mechanism 52 described above as they appear in a locked and unlocked position, respectively. It should be noted in FIG. 6 that upon retracing the arms 62 as shown therein, a clearance is provided between the ends 64 of the arms which are rounded and the inner perimeter of the central hub 26 of the tape reel.

Figures 8, 9, 10, 11, 12, 13:
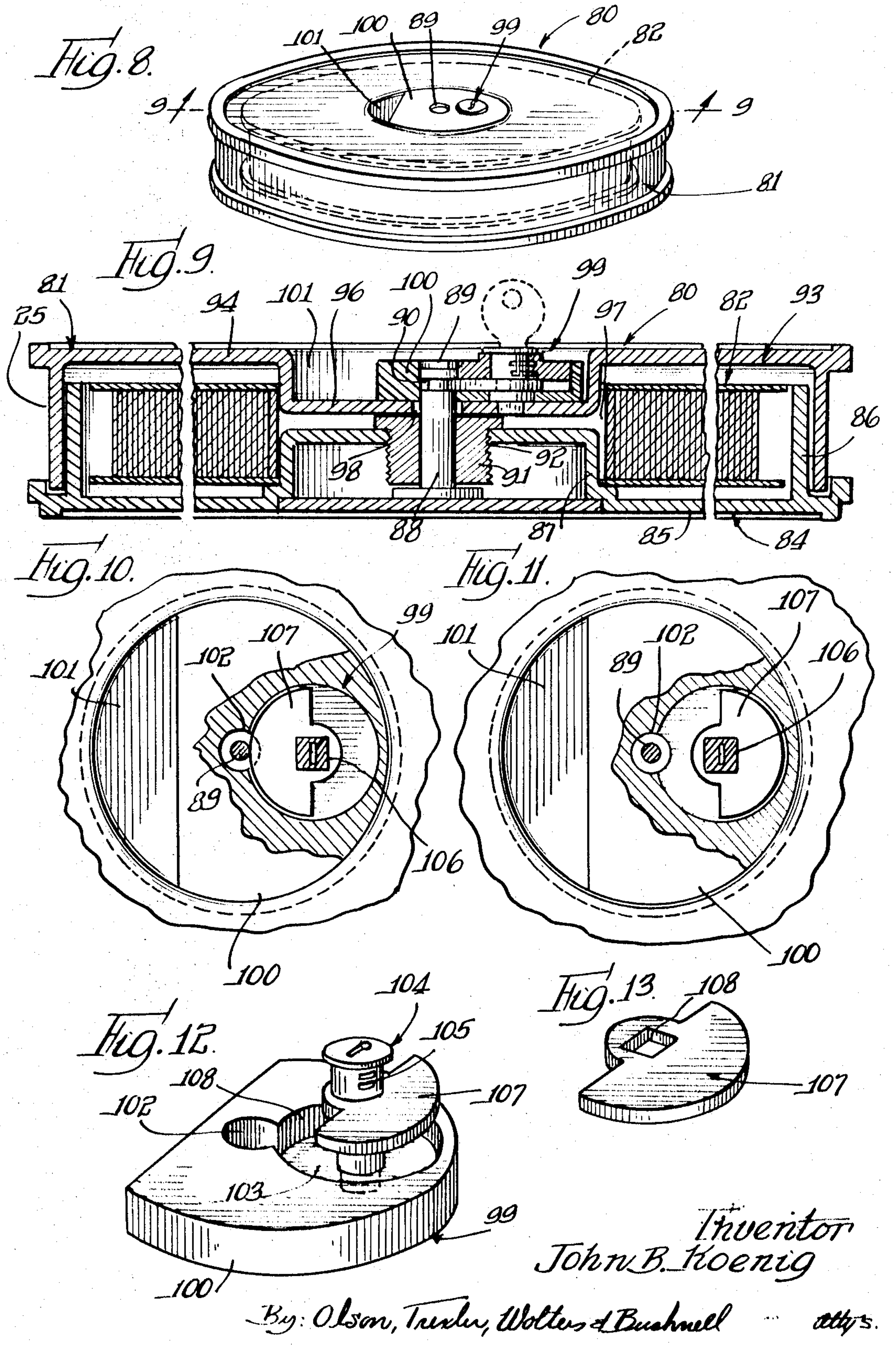
FIG. 8 is a perspective view of a tape reel and a second embodiment of a locking device according to the invention, secured thereto.
FIG. 9 is an enlarged cross-sectional view of the tape reel and locking device of FIG. 8 taken along the line 9–9 thereof.
FIG. 10 is a sectioned plan view of the lock mechanism of the locking device of FIG. 9.
FIG. 11 is a sectioned view of the lock mechanism.
FIG. 12 is an enlarged exploded perspective view of the locking mechanism of FIGS. 10 and 11.
FIG. 13 is an enlarged perspective view of the locking plate of the locking mechanism of FIG. 12.

Looking now at FIGS. 8—13 of the drawings, there is shown therein another embodiment of a tape reel locking device 80 according to the invention. The locking device 80 is shown in a locked position with respect to a tape reel 82 in FIGS. 8 and 9 of the drawings. This particular embodiment of locking device, as can be seen in FIG. 9, serves to prevent a tape reel protected thereby from being mounted on apparatus which provides access to the information on the tape as well as to prevent access to the tape itself.

Referring now to FIG. 9, the locking device 80 comprises a container 81 including a cylindrically shaped base portion 84 having a circular base wall 85 and a sidewall 86 encircling the outer perimeter of the base wall and extending outwardly therefrom. Connected to the base wall 85 at the center thereof and extending in the direction of the sidewall 86, is a plug portion 87. Mounted at the center of the plug portion 87 and extending in the same direction thereof, but being longer in length, is a shaft 88 having, near its free end 89, a slot 90 therein. The shaft 88, as shown in FIG. 9, is mounted to plug portion 87 by means of an outer threaded hub 91 which is screwed into threaded aperture 92 of the plug portion 87. A cylindrically shaped cover portion 93 having a circular cover plate 94 and a sidewall 95 extending outwardly therefrom, is provided to mate with base portion 84. The inner diameter of the cover portion 93, as can be seen in FIG. 9, is larger than the outer diameter of the base portion 84, so that sidewall 95 of cover portion 93 is able to be fitted radially outwardly from and around sidewall 86 of base portion 84, thereby completely surrounding the magnetic tape reel 82 and tape located therebetween.

As will be noted, the circular cover plate 94 includes at the center thereof an indentation 96 formed therein which is substantially equal in size to the plug portion 84; the plug portion 87 and indentation 96 being of a size so as to be able to be fitted into central opening 97 of a conventionally sized tape reel, such as 82, in an opposing relation as shown in FIG. 9. An aperture 98 is provided at the center of indentation 96. Aperture 98 is aligned with shaft 88 upon the mating of the cover and base portions 93 and 84, respectively. A separate lock mechanism 99, which will be described in more detail hereinafter, is placed into indentation 96 of cover portion 93 and engages the slot 90 in shaft 88, thereby locking the cover and base portions together about the magnetic tape reel 82.

Referring now to FIGS. 10—13, in conjunction with FIG. 9 of the drawings, the lock mechanism 99 will be described in greater detail. As can be seen in FIG. 12, the lock mechanism 99 includes a circular-shaped block portion 100 having a section eliminated therefrom. In this manner, an open area 101 is thereby provided between cover portions 93 and block 100 so that one may easily remove the lock mechanism 99 from indentation 96 when necessary. A central aperture 102 is provided in block 100 for receiving therein the free end 89 of shaft 88 upon the positioning of block 100 within indentation 96. A larger circular-shaped aperture 103 is provided in block 100; aperture 103 intersecting the smaller central aperture 102 thereof, and the two communicating within block 100. Inserted into aperture 103 is a lock 104 of conventional design including a tumbler 105 and square shank portion connected thereto, best seen in FIGS. 9 through 11. A semicircular plate portion 107 having a square hole 108 therethrough is mounted for rotational movement on square shank 106 of the lock 104. The semicircular plate portion 107, upon the insertion of lock 104 in aperture 103, rotates within a slot 108 formed within the block 100 in a direction parallel to the outer surfaces thereof. Thus, subsequent to the placing of the cover and base portions over the magnetic reel in mating relation, the block 100, with the lock 104 positioned as shown in FIG. 11, is placed into indentation 96 with the smaller aperture 102 thereof engaging shaft 88. A key (not shown) is then inserted into the lock 104 and turned so that plate 107 is moved into engagement with the slot 90 in the free end of shaft 88. This serves to secure the device 80 onto reel 82, thus preventing unauthorized access to the tape reel.

Figures 14, 15, 16, 17:
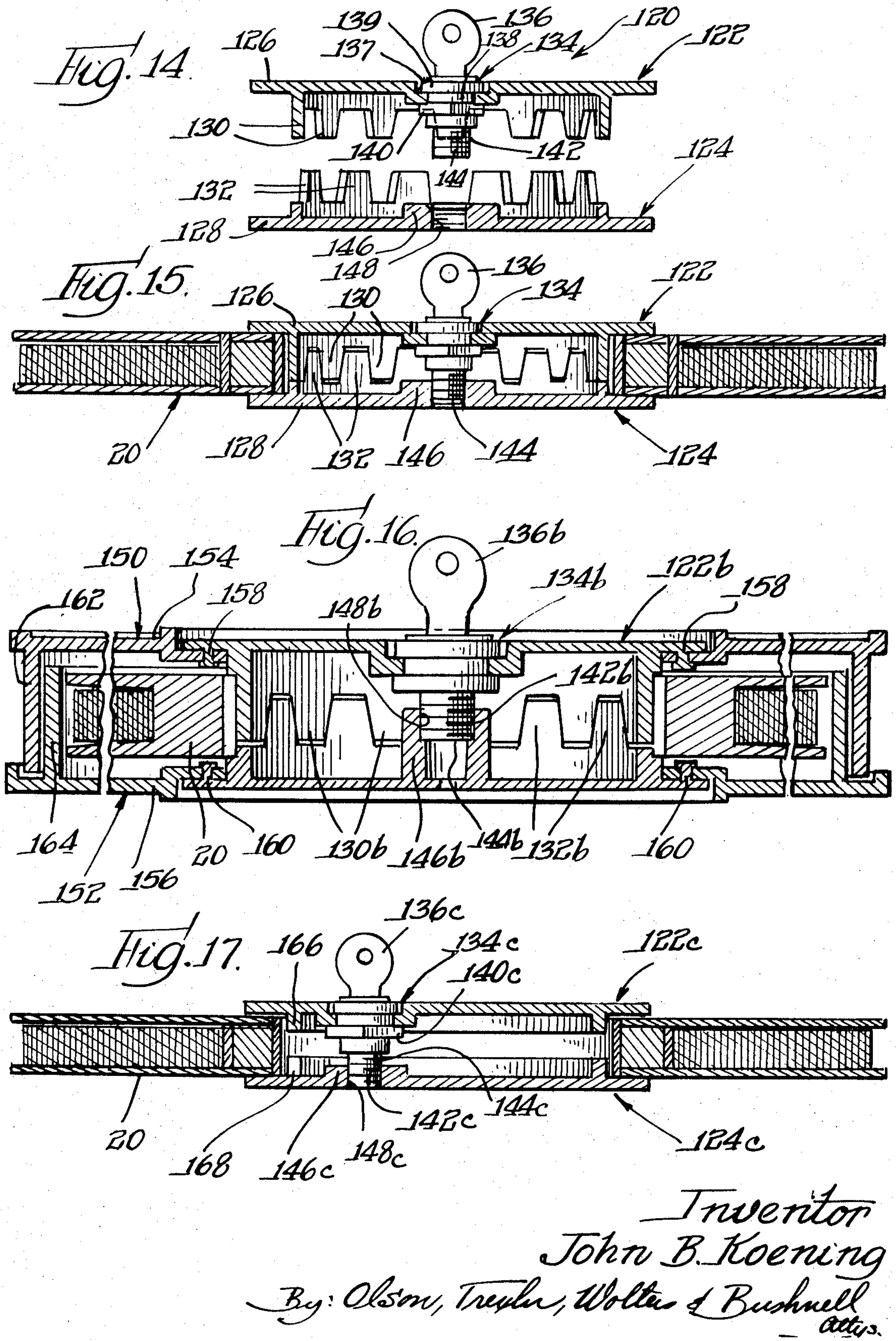
FIG. 14 is an exploded sectional view showing another modified form of the present invention.
FIG. 15 is a sectioned view of the lock mechanism of FIG. 14 shown assembled with a reel.
FIG. 16 is a sectional view similar to FIG. 15 but showing a further slightly modified form of the present invention.
FIG. 17 is a sectional view similar to FIG. 15 and showing a further modified form of the present invention.

FIGS. 14 and 15 show a modified form for the present invention which is adapted to be assembled within the central opening of a standard reel 20 in somewhat the same manner as the embodiments of FIGS. 1 through 7. In this form of the invention, the device 120 comprises opposed members 122 and 124. These members respectively include circular disc portions 126 and 128 having a diameter greater than the internal diameter of the reel 20 and adapted to overlie and fit against opposite sides of the reel as shown in FIG. 15. Interengageable stop elements or teeth 130 and 132 respectively project axially in opposite directions from the disc portions 126 and 128. These teeth are annularly arranged and project for engagement with each other for preventing relative rotation between the members 122 and 124 when the members are locked together and in assembled relationship with the reel as described below. While various constructions and techniques may be used for producing the members 120 and 124, they are preferably molded from a suitable tough strong plastic material.

A lock unit 134 operable by a removable key 136 is mounted in a central aperture 137 in the member 122. The internal mechanism of the lock unit 134 may be of known construction and need not be described in detail. However, it is to be noted that the structure is such that the lock unit includes an outer fixed body 138 having a flange overlying and recessed in the disc 126 secured with respect to the member 122 by a nut 140. The lock unit has a stud portion 142 extending axially from the body 138. The stud portion is normally locked against rotation by the mechanism of known construction within the body 138 and is rotatable upon insertion and turning of the key 136.

The lock stud portion 142 has means thereon interengageable with complementary means on the member 124 for releasably securing the members 122 and 124 with respect to each other. More specifically, the stud element 142 is provided with helical threads 144. A boss 146 centrally located on the member 124 has an internally threaded aperture 148 for receiving the threaded stud 142. The internal threads may be formed integrally with the boss 146 as shown, or, if desired, a metal or other insert having an internally threaded aperture may be secured within the boss for receiving the threaded stud 142. Preferably, the axial length of the stud 142 and the boss 146 is such that each has a plurality of thread convolutions so as to preclude the stripping of the threads in the event of an unauthorized attempt to pry the members 122 and 124 apart.

When assembling the device 120 with the reel 20, members 122 and 124 are first positioned in opposite sides of the reel. The teeth 130 and 132 are then inserted into the central reel opening in a manner such that they mesh together and prevent relative rotation between the members 120 and 124. The members may then be securely locked together by turning the key 136 so as to rotate the stud 142 into the threaded aperture 148. When the stud has been fully tightened, the key is removed from the lock and since the members 122 and 124 cannot be rotated relative to each other, they cannot be disassembled without the aid of the key. The particular lock unit 134 is compact and provides a highly effective connection between the members. In addition, the simple and compact connection enables the lock body to be of the length to include several tumblers so that a relatively complex key shape is required and any possibility of any unauthorized opening of the lock is minimized.

In FIG. 16 there is shown another embodiment of the present invention which incorporates features of the structure shown in FIGS. 14 and 15 as indicated by the application of identical reference numerals with the suffix *b* added to corresponding elements. In this embodiment, the members **122*b* and 124*b* are respectively connected with complementary container members 150 and 152 which serve to receive and completely enclose a reel 20 or the like. In the embodiment shown, the members 122*b* and 124*b* are formed separately from and connected to disc portions 154 and 156 of the container members. The member 122*b* is provided with lugs 158 spaced around the periphery thereof and projecting through apertures and an inner margin of the disc portion 154 and the member 124*b* is provided with similar lugs 160 projecting through apertures in the disc portion 156. If desired, the member 122*b* may be formed integrally with the disc portion 154 and the member 124*b* may similarly be formed integrally with the disc portion 156. The container member 150 has an annular flange portion 162 projecting generally axially around its periphery and overlapping a similar flange portion 164 projecting from the member 152 for enclosing the periphery of the reel 20** or other article housed within the container.

FIG. 17 shows another modified form of the present invention similar to the embodiments of FIGS. 14 and 15 as indicated by the application of identical reference numerals with the suffix *c* added to corresponding elements. In this embodiment the lock unit **134*c* and the cooperable internally threaded boss 146*c* are located on an axis substantially offset from the central axis of the device. The members 122*c* and 124*c* are simplified in that the previously described teeth have been omitted. However, these members do include axially projecting annular flange elements 166 and 168 extending into the central opening in the reel 20** for preventing lateral shifting of the members relative to the reel.

In the embodiments of FIGS. 14 through 16, it is to be noted that the lock unit and cooperable internally threaded boss are located on the central axis of the device and the annularly arranged teeth are on circles having a diameter similar to the internal diameter of the reel. This arrangement facilitates easy alignment of the threaded stud of the lock unit with the internally threaded boss during assembly of the locking device with the reel. In the embodiment of FIG. 17, the members **122*c* and 124*c*** are somewhat simplified in that the interengaging teeth are eliminated.

In the FIG. 17 embodiment the locking unit **134*c* and cooperating internally threaded boss 146*c* serve the dual functions of releasably securing the parts together and also of preventing the members 122*c* and 124*c* from rotating relative to each other since the lock and boss are offset from the central axis of the device. In this embodiment the flanges 166 and 168 also combine with the lock unit 134*c* and the internally threaded boss in preventing the members 122*c* and 124*c*** from rotating relative to each other since the flange elements engage the reel and prevent the members from rotating about the axis of the lock unit.

Thus, the invention provides a means whereby access to a magnetic recording-element storage unit is given to authorized persons only.

It will be obvious to those skilled in the art that changes and modifications may be made without departing from this invention in its broadest aspects and therefore the aim in the appended claims is to cover all such changes and modifications as come within the true spirit and scope of the invention.

What I claim is:

1. A storage unit for at least one recording element, said unit including means for mounting said unit with said element on a machine whereby information recorded on said element is made accessible, and locking apparatus removably locked with respect to said unit for preventing the unauthorized mounting of said unit on said machine, thereby to in turn prevent unauthorized access to said recorded information.

2. A storage unit as claimed in claim 1 wherein said unit includes a reel for an element wound thereon and having a hub portion with a central opening therein for mounting said reel on said machine, said locking apparatus including means for blocking the central opening of said hub portion to prevent the unauthorized mounting of said tape reel on said recording machine.

3. A storage unit as claimed in claim 2 wherein said hub portion includes, in the side thereof, an aperture communicating with said central aperture, and wherein said locking apparatus includes a base portion having a plug portion extending therefrom, said plug portion being of a size sufficient to be inserted into the central opening of said reel, said plug portion including a lock mechanism mounted therein, said lock mechanism including a rotatable plate member which upon rotating in a first direction is positioned entirely within said plug portion, and upon rotating in a second direction, is received in the aperture in said hub portion to lock said reel, thereby to prevent the unauthorized mounting thereof on said recording machine.

4. A storage unit as claimed in claim 2 wherein said hub portion includes in the side thereof at least one aperture, said aperture communicating with said central opening of said hub portion, wherein said locking means includes a base portion having a plug portion extending therefrom, said plug portion being adapted for receipt in the central opening of said reel, said plug portion including a lock mechanism mounted therein, said lock mechanism including a rotatable bar member having at least one arm member pivotally connected thereto for movement upon the rotation of said bar member, said arm member, upon the rotation of said bar member in a first direction, being inserted into said aperture in said hub portion to lock said plug portion within said central opening, and said arm member, upon the rotation of said bar member in a second direction, being removed from within said aperture in said hub portion to unlock said plug portion from within said central opening.

5. A storage unit as claimed in claim 2 wherein said locking apparatus comprises a lockable container for said reel, including a cylindrically shaped base portion having at the center thereof a shaft member extending therefrom, a mating cover portion including at the center thereof in alignment with said shaft member, a central aperture through which the free end of said shaft member extends upon the mating of said base and cover portions about said reel, and a separate lock mechanism for engaging said free end of said shaft member and being locked thereto, thereby to prevent unauthorized access to information recorded on said tape.

6. A storage unit as claimed in claim 5 wherein the cover portion of said lockable container includes at the center thereof an indented portion for receipt in the central opening of said reel, wherein said base portion includes extending from the center thereof and surrounding said shaft member, a plug portion, also for receipt in the central opening of said reel in an opposing relation with said indented portion, and wherein said separate lock mechanism is of a size and shape adapted to be received in said indented portion of said cover portion.

7. A storage unit as claimed in claim 6 wherein said shaft member includes near the free end thereof, a recessed portion, wherein said separate lock mechanism includes a block portion having a first aperture therein adapted for receiving therein the free end of said shaft member, and a second larger aperture communicating with said first aperture within said block portion, said second aperture including therein a rotatable plate portion which upon rotation in a first direction extends into said first aperture so as to engage the recess in the free end of said shaft member to lock said cover portion to said base portion, and upon rotation in a second direction, is removed from within said recess to allow for the separation of said cover and base portion.

8. A storage unit as claimed in claim 2, wherein said locking apparatus comprises first and second oppositely disposed members traversing said central opening, and connecting means including a lock unit attached to one of said members and including a lockable rotatable element projecting axially toward the other of said members, and cooperable attaching means on said rotatable element and said other member adapted to be selectively connected and disconnected upon rotation of said rotatable element for securing said members to each other, and means for preventing rotation of said members relative to each other.

9. A storage unit as defined in claim 8, wherein said cooperable means comprises helical threads on said rotatable element and complementary helical threads on said other of said members.

10. A storage unit as defined in claim 9, wherein said rotatable element and said helical threads are located substantially on a central axis of said members, said connecting means including interengaging elements on said members for preventing rotation of said members relative to each other.

11. A storage unit as defined in claim 9, wherein said rotatable element and said helical threads are located on an axis offset substantially from a central axis of said members, said rotatable element and threads serving both to secure said members with respect to each other and for preventing rotation of the members relative to each other.

12. A storage unit as defined in claim 11, wherein said members include element engageable with said reel for preventing rotation of said members relative to the reel and around the axis of said rotatable element.

13. A locking apparatus for a reel having a central opening therein comprising first and second members disposed in opposing relationship for traversing said central opening, a lock unit attached to said first member and including a lockable rotatable element projecting axially toward said second member, cooperative attaching means on said rotatable element and said second member adapted to be selectively connected and disconnected upon rotation of said rotatable element, and interengaging means on said first and second members for preventing rotation of said members relative to each other when said members are assembled with a reel.

14. A locking apparatus, as defined in claim 13, wherein said attaching means comprises helical thread convolutions on said rotatable element, and complementary helical thread convolutions on said second member.

15. A locking apparatus, as defined in claim 13, wherein said interengaging means comprises tooth elements extending oppositely from said first and second members and engaging each other.

16. A locking apparatus, as defined in claim 13, wherein at least one of said first and second members includes peripherally arranged axially extending flange means for enclosing the periphery of said reel.

17. A locking apparatus for a reel having a central opening therein comprising first and second members disposed in opposing spaced-apart relationship for overlying opposite sides of said reel and traversing said central opening, said members having a common axis alignable with a central axis of said reel opening, a lock unit attached to said first member and including a lockable rotatable axially extending stud having helical thread convolutions thereon, and complementary helical thread convolutions on said second member aligned with said stud and adapted to be selectively connected to and disconnected from said stud upon rotation of the stud.

18. A locking apparatus, as defined in claim 17, wherein said stud is disposed for rotation about an axis substantially coinciding with said first-mentioned axes, and said members including interengaging means for preventing relative rotation of said members when said stud threadedly engages said complementary thread means.

19. A locking apparatus, as defined in claim 17, wherein said stud and said complementary helical thread means have a common axis parallel to and offset from first-mentioned axes.

20. A locking apparatus, as defined in claim 19, wherein said members include elements engageable with a reel for holding said members against rotation relative to the reel and around the axis of said stud when said members are assembled with the reel.